US012598462B2

(12) United States Patent
    Kuo et al.

(10) Patent No.: US 12,598,462 B2
(45) Date of Patent: Apr. 7, 2026

(54) RESERVATIONS OF COMPUTING RESOURCES

(71) Applicant: Hewlett-Packard Development Company, L.P., Spring, TX (US)

(72) Inventors: Ying Chih Kuo, Taipei City (TW); Chung-Chun Chen, Taipei (TW); Chih-Ming Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 140 days.

(21) Appl. No.: 18/503,728

(22) Filed: Nov. 7, 2023

(65) Prior Publication Data

US 2025/0150825 A1    May 8, 2025

(51) Int. Cl.
    G06F 7/04      (2006.01)
    H04W 12/06     (2021.01)
    H04W 12/08     (2021.01)

(52) U.S. Cl.
    CPC ........... *H04W 12/08* (2013.01); *H04W 12/06* (2013.01)

(58) Field of Classification Search
    CPC ..... H04W 12/08; H04W 12/06; H04W 12/61; H04W 12/72; H04W 12/43; G06F 21/335; G06F 21/44; H04L 9/0866; H04L 63/0853; H04L 63/0876; H04L 63/10
    See application file for complete search history.

(56) References Cited

U.S. PATENT DOCUMENTS 11,172,350  B1 *  11/2021  Chaugule .............. H04W 12/06
2020/0112854  A1 *  4/2020  Namiranian ...... H04M 1/72445
2021/0400479  A1 *  12/2021  Li ......................... H04W 12/71
2022/0327438  A1    10/2022  Bach et al.

FOREIGN PATENT DOCUMENTS

CN          105657818 A    6/2016
CN          105704705 A    6/2016
KR    10-2013-0073430 A    7/2013

OTHER PUBLICATIONS

Xiong et al, Shared Resource and Service Management for Mobile Transparent Computing, Nov. 15, 2013, IEEE, pp. 1846-1853. (Year: 2013).*
Kocak et al, Highly Distributed Resource Discovery and Allocation in the Grid, Jul. 28, 2004, IEEE, pp. II-525-II-528. (Year: 2004).*

* cited by examiner

*Primary Examiner* — Philip J Chea
*Assistant Examiner* — Jenise E Jackson
(74) *Attorney, Agent, or Firm* — Quarles & Brady LLP

(57)    ABSTRACT

An example computing device accesses a resource allocation network service utilizing a wireless network connection in accordance with embedded SIM (eSIM) functionality to identify and reserve computing resources. The computing device transmits a request to the resource allocation server that includes computing device profile information stored in the eSIM. The resource allocation network service processes the requests and receives additional profile information from the identified physical computing resource. The resource allocation network service then establishes a reservation and generates allocation information that includes credential information and is sent to the requesting computing device and the physical computing resource. When the computing device attempts to access the computing resource (e.g., the workstation), the physical computing resource authenticates the computing device based allocation information transmitted by the computing device.

7 Claims, 9 Drawing Sheets

RESERVATIONS OF COMPUTING RESOURCES

BACKGROUND

The utilization of generic or multi-person working stations in an environment has allowed office spaces to significantly increase efficiency of a designated area. Users have the ability to access physical computing resources such as workstations, printers, external monitors, projectors, printers, e.g., as needed. Different implementations of organizational layouts have increased inefficiency of users attempting to utilize specific physical computing resources.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1A:
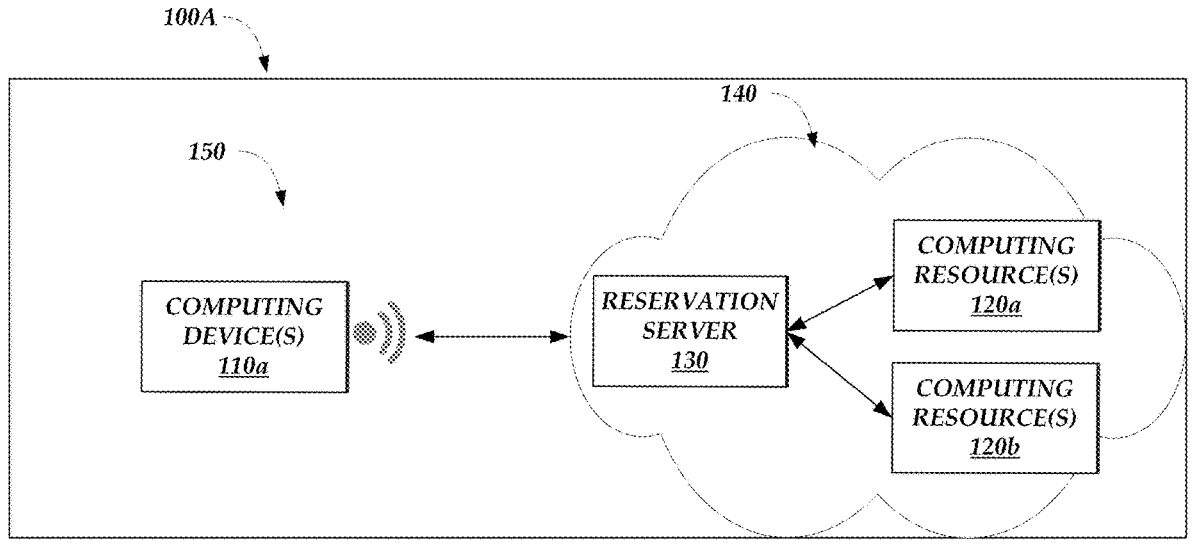
FIG. 1A is an example diagram of a system including a computing device for interaction with a reservation service via an externally wireless network connection to reserve access to physical computing resources.

Certain examples described herein provide a system for accessing or reserving access to physical computing resources by a computing device. Many organizations have implemented (in whole or in part) to shared physical computing resources within a physical premises. Such physical computing resource include, but are not limited to workstations (e.g., docking stations or docking devices), monitors, projection equipment, microphones, speakers, other input devices, other output devices, network ports or plugs, power ports or plugs, wireless charging components and the like. In some instances, access to physical computing resources is limited to managing access based on a "first come, first serve" basis. In scenarios including a distributed workforce with varying schedules and needs for physical computing resources when in physical proximity to a location, access to specific physical resources can be very inefficient or required significantly more interactions. This often yields to inefficient allocation of physical computing resources and is not well suited for computing devices (and associated users) that are traditionally remote. Further, the utilization of freely available workstations can lead to potential network vulnerabilities, such as when a physical connection to a workstation provides direct network access for a computing device. In such example, the workstation or docking device does not independently authenticate the computing device. Accordingly, access to physical computing resources may be more inefficient and can yield to security vulnerabilities. Additionally, access management may also require additional applications that create additional inefficiencies in requiring diverse types of hardware or software configurations for a participating computing device.

Certain examples described herein provide a system for accessing a physical computing resource by a computing device by way of implementing authentication of the electronic devices from a submitted reservation request. Implementation of electronic devices with wireless network capabilities creates an opportunity to utilize allocation information that is uniquely generated on behalf of requesting electronic device. An increase for flexibility and expansion of securing wireless network connections has led to the adoption of embedded subscriber identity module (eSIM) that corresponds to an integrated IC that is often permanently installed on computing devices. The eSIM can be further configured to be programmed with a plurality of identification information for use in cellular-based communications. Illustratively, the allocation information may be stored in conjunction with eSIM profile information that is already stored by the electronic device and utilized for purposes of wireless network connectivity.

Example of the eSIM profile information includes unique identifiers stored on an eSIM, such as international mobile subscriber identity (IMSI), integrated circuit card identification number (ICCID), mobile station international subscriber directory number (MSISDN) information utilized to establish wireless communication functionality. Specifically, the computing device may be configured, as part of storing a plurality of profiles corresponding the eSIM, to host allocation information for use in reservation requests to secure access to a computing resource(s). Specifically, the allocation information stored as eSIM profile information can illustratively include device serial number, employee identification number, dock serial number, and a credential code that is transmitted as part of a reservation request and request for access to a physical computing resource. In some examples, the allocation information may be stored in accordance with eSIM configurations such that the allocation information is not accessible directly (or otherwise manipulable) by a user of the computing device.

The system as described includes a computing device that is operable by a user. A computing device hosts a secure storage location that can illustratively correspond to an eSIM embedded in the computing device. The system also includes one or more physical computing resources (or computing resources) that a user is requesting to reserve and access. As previously described, the physical computing resources can include, but are not limited to, workstations (e.g., docking stations or docking devices), monitors, projection equipment, microphones, speakers, other input devices, other output devices, network ports or plugs, power ports or plugs, wireless charging components and the like The system can further include a server (or set of servers) that host a resource allocation service or reservation service that provides an interface system that is communicable with the computing device and a computing resource. The computing device may access the resource allocation service using a wireless connection (utilizing the configuration data in an eSIM) that may be able to directly access the resource allocation service via a common communication network. Alternatively, the computing device may access the resource allocation service via an external communication service.

The computing device may be comprised of a wireless transceiver that is communicable with a wireless network (e.g., wireless wide area network (WWAN)), a processor, a memory storage device configured to store processor instructions, and an eSIM that hosts profile information of the computing device. The processor is instructed to establish a connection with a network that hosts profile information server and computing resource via wireless communication wherein the connection to the network allows access to a reservation server interface system. The processor further receives instructions to submit a request to the reservation server requesting a reservation of physical computing resource for a defined period of time. The duration of time may be reserved for any requested time that is available for utilization of the physical computing resource. The processor receives instructions by a resource allocation service to download a customized eSIM profile, such as via a Local Profile Assistant (LPA) software application that can access and modify information stored as eSIM profile data (or modify an eSIM configuration mode associated with stored profile information. In some examples, the customized eSIM profile includes authentication identification including authentication credentials for authentication of the computing device with a computing resource in a subsequent interaction.

In some examples, the resource allocation service may accept or deny the initial reservation request transmitted by the computing device. In the event of a denial of the initial reservation request, the resource allocation service will not transmit the allocation information to the computing device. Accordingly, without allocation information (or with expired allocation information), the customized eSIM profile on the computing device will not include authentication identification and authentication credentials to verify an allocated reservation of a physical computing resource. This will result in the physical computing resource being inoperable to the computing device. For instance, the resource allocation service may deny the initial reservation request transmitted by the computing device if the device identifier information included in the request (as stored in an eSIM) does not match a list of device identifiers that can reserve computing resources. In another example, the resource allocation service may deny the initial reservation request transmitted by the computing device if the device identifier information included in the request (as stored in an eSIM) matches a list of device identifiers that are prohibited from reserving computing resources.

The computing device, after receiving the allocation information and storing in as eSIM profile information (via an LPA), is then accessible to use the physical computing resource the reservation request was originally submitted for. User operating the computing device may attempt to establish a connection with the physical computing resource by a physical connection. An example of the wired connection established may be a wired communication connection with any variation of a communication protocol (e.g., universal serial bus (USB), ethernet, etc.). The user may locate the reserve physical computing resource and establish a physical connection with the computing resource, wherein the processor is instructed to transmit the customized eSIM profile to the physical computing resource for authentication purposes and establish granted access. The computing device may illustratively detect the computing resource based on a physical connection or a logical connection, such as a network connection/detection.

In some examples, the user may have selected an incorrect physical computing resource in the workspace and attempts to make a physical connection with the incorrect physical computing resource. In such example, the computing device may transmit the customized eSIM profile (e.g., the authentication credentials in the allocation information) to the physical computing resource. In this example, the physical computing resource does not grant access to the operable functions and attributes of the physical computing resource. In a similar example, if a user attempts to access a "correct" computing resource outside of an establish time window or time frame provided for access, the physical computing resource does not grant access to the operable functions and attributes of the physical computing resource based on expired (or not validated) timing criteria that may be associated with the allocation information.

The resource allocation service may be comprised of a server (or set of servers) that include a transceiver that is communicable with a network, a processor, and a memory storage device configured to store processor instructions. The network connection may be a wireless or wired connection. The resource allocation service receives a request from a computing device to request a reservation for a specific device within the network for a specific duration of time. The reservation request may further comprise profile information of the computing device submitting the request along with user information that may have been programmed onto the device for user and device identification purposes. As described above, the request may provide such information directly from eSIM profile, which may not be directly accessible by a user. The resource allocation service may be configured to authenticate if the device is authorized to submit a request to reserve a physical computing resource and/or the service may be configured to authenticate if the user of the device is authorized to submit a request to reserve a physical computing resource.

The processor of the reservation server transmits a request to receive profile information of the physical computing resource that is requested to be reserved for generating allocation information of the reservation request. The allocation information may include information regarding device identification and duration of requested reservation. The reservation server may receive from the computing device, at the time of computing device authentication by the physical computing resource, that a connection was successful, and the computing device was granted access to the physical computing resource. The reservation server may make available for reservation, the physical computing resource, when the duration of reservation time has lapsed, or any configurable setting configured by an administrator.

The computing resource may be comprised of a wired, wireless transceiver, or a combination thereof, that is communicable with a wireless network, a processor, a plurality of input and output ports, and a memory storage device configured to store processor instructions. The computing resource, sometimes referred to as a physical computing resource or computing resource, may be electronic devices that are operable with the computing device. As previously described, the physical computing resources can include, but are not limited to, workstations (e.g., docking devices), monitors, projection equipment, microphones, speakers, other input devices, other output devices, network ports or plugs, power ports or plugs, wireless charging components and the like. The computing resource may be located within a network of a work environment wherein at least one of a computing resource is further located within. The physical computing resources may not all be identical devices, some physical computing resources may be identical devices within the network while other computing resources of the at least one type of computing resource are not.

The physical computing resources may receive a request from the reservation server to transmit a device identification information that will be processed by the reservation server to create allocation information (or portions of profile information) for the reservation request event. The computing resource may receive the unique profile and store the profile in memory. The computing resource utilizes the unique profile to authenticate a requesting computing device that attempts or will attempt to establish a physical connection. Based on a physical connection established by the computing device (or other triggering event), the physical computing resource receives an allocation information from the computing device based on the allocation information stored as eSIM profile information. The unique profile hosts an authentication credential allowing the computing resource processor to verify the unique profile that was received from the reservation server with the unique profile received by the computing device.

Based on authenticating the computing device is the correct device with matching unique profile information, the computing resource grants access to operable functions and attributes of the computing resource. In some embodiments the authentication of the computing device may limit the operable ports and attributes that are granted by the computing resource for utilization by the computing device bases on predetermined configuration. In another embodiment the physical computing resource may deny access to the computing device when a physical connection is established with the computing resource based on the failure to authenticate. This can occur by incorrect authentication credential, invalid timing information, or a combination thereof.

FIG. 1A is a system diagram of an example embodiment of the system 100A for implementing a physical computing resource reservation system in accordance with various aspects of the present application. System 100A includes a wireless network 150 that computing device(s) 110a has an established connection with a wireless transceiver, that is in communication to the network 140. Network 140 is an example of a company hosted network where a plurality of devices is connected to such as the reservation server 130 and computing resource(s) 120a-120b. The computing device(s) may be remotely located to the network 140 in which a user is attempting to reserve a computing resource(s) 120a-b. The computing device(s) 110a host an eSIM installed in a chipset, built into the device, which may host device profile information that was configured onto the eSIM when provided to the user.

The device profile may host information regarding device information such as device serial number, employee info such as employee ID, physical computing device serial number, and credentials such as credential code. As previously described, the physical computing resources can include, but are not limited to, workstations (e.g., docking stations), monitors, projection equipment, microphones, speakers, other input devices, other output devices, network ports or plugs, power ports or plugs, wireless charging components and the like. Further, Non-limiting example of the computing device(s) 110a are laptops, personal computers, mobile devices, and those of the like.

The computing device(s) 110a establishes a connection via a virtual private network (VPN) to a company hosted network 140 to transmit a request to reserve a computing resource(s) 120a-b. The reservation request may include device profile information, as previously described, to authenticate the device and user of the computing device(s) 110a. The reservation request is sent to the reservation server 130, where the reservation server 130 captures the device profile information including the request information and authenticates the computing device(s) 110a and the computing resource(s) 120a-b and generates allocation information. The reservation request may include information regarding unique identification of the computing resource(s) 120a-b that a user is attempting to reserve along with a desire duration of time to access the computing resource.

The reservation server 130 functions as or otherwise implements a resource allocation service that generates, collects, and transmits the allocation information to the computing device(s) 110a and computing resource(s) 120a-b once the device profile and reservation is confirmed. The computing device(s) 110a stores the received allocation as eSIM profile data or otherwise updates previously created eSIM profile data with the received allocation information. Once the computing resource(s) 120a-b obtains the allocation information a computing device(s) 110a that does not have matching allocation information will not gain access to the computing resource(s) 120 a-b or will otherwise be limited to less access than requested. The computing resource(s) 120 a-b performs a check for allocation information and verifies if a computing device(s) 110a attempting to make a physical connection with the computing resource(s) 120a-b comprises matching allocation information. The physical connection may sometimes be referred to as a triggering event, wherein the connection of computing device(s) and physical computing resource(s) make an electrical connection. The electrical connection may be an analog communication connection or a digital communication connection. The detection of a triggering event may further correspond to determination that the computing device(s) and the physical computing resource(s) have a common network. If the allocation information of the computing device(s) 110a and the computing resource(s) 120a-b match, then the computing resource(s) 120a-b unlocks functionality and enables access for the computing device.

Figure 1B:
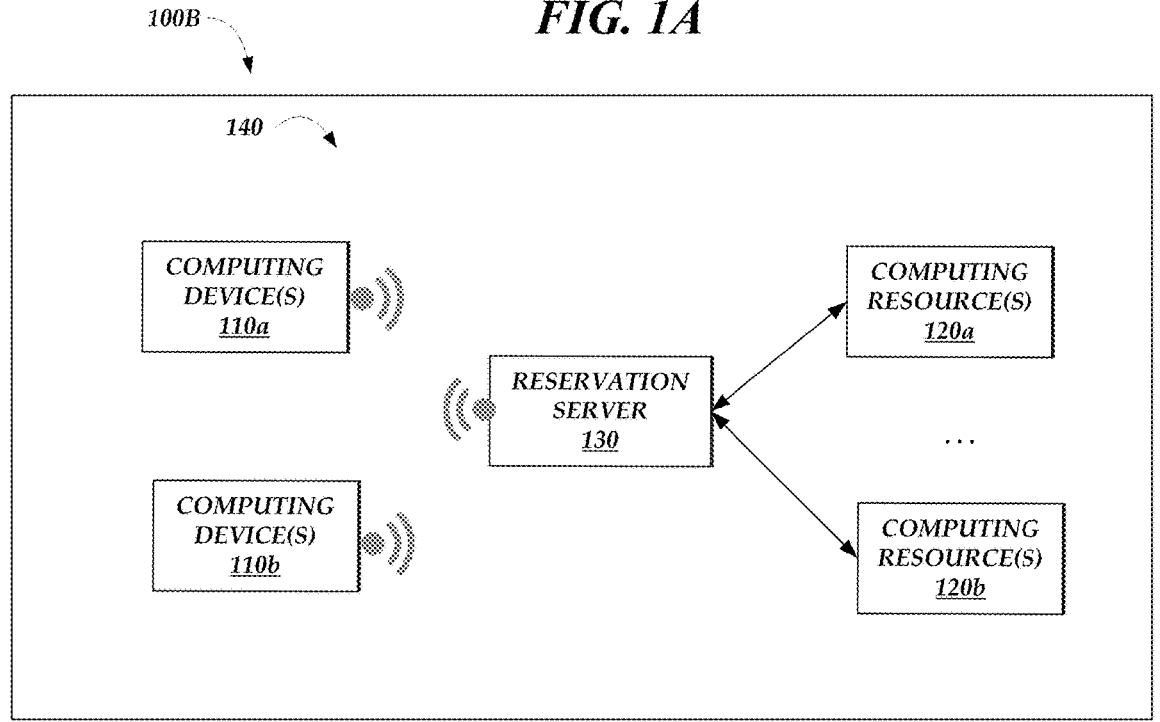
FIG. 1B is an example diagram of system including a computing device for interaction with a reservation service via a wireless network connection to reserve access to physical computing resources.

FIG. 1B is a system diagram of an example embodiment of the system 100B for implementing a physical computing resource reservation system in accordance with various aspects of the present application. System 100B includes a network 140 in which the plurality of computing device(s) 110a-b, reservation server 130, and plurality of computing resource(s) 120a-b are connected to. The user may be located within the company network 140 and attempt to reserve a computing resource(s) 120a-b. The computing device(s) 110a as described in FIG. 1A host an eSIM built into the device that may host device profile information that was configured onto the eSIM when provided to the user. The device profile may host information regarding device information such as device serial number, employee info such as employee ID, dock info such as dock serial number, and credentials such as credential code.

As the computing device(s) 110*a-b* are located within the network 140, when the user attempts to reserve a computing resource(s) 120*a-b*, the computing device(s) 110*a-b* communicates wirelessly to the reservation server 130 a reservation request. The reservation request may include information regarding device profile information, where the reservation server 130 verifies user authorization. The reservation server 130 further request device profile information from the computing resource(s) 120*a-b* that is attempting to be reserved. The reservation server 130 generates allocation information that is transmitted to the computing device(s) 110*a-b* and computing resource(s) 120*a-b* that a reservation request was attempted from, and a reservation request was attempted for. The user may attempt to establish a connection with the physical computing resource(s) 120*a-b* the reservation was attempted for.

Once a connection is made to the physical computing resource(s) 120*a-b* the physical computing resource verifies if the allocation information stored on the computing device(s) 110*a-b* matches the allocation information stored on the physical computing resource(s) 120*a-b*, and only if the allocation information matches do the physical computing resource(s) 120*a-b* enables accessibility to all functions of the device. Non-limiting examples of allowable functions of the physical computing resource(s) 120*a-b* are device charging, utilization of IO ports, accessibility of external devices, etc.

Figure 2A:
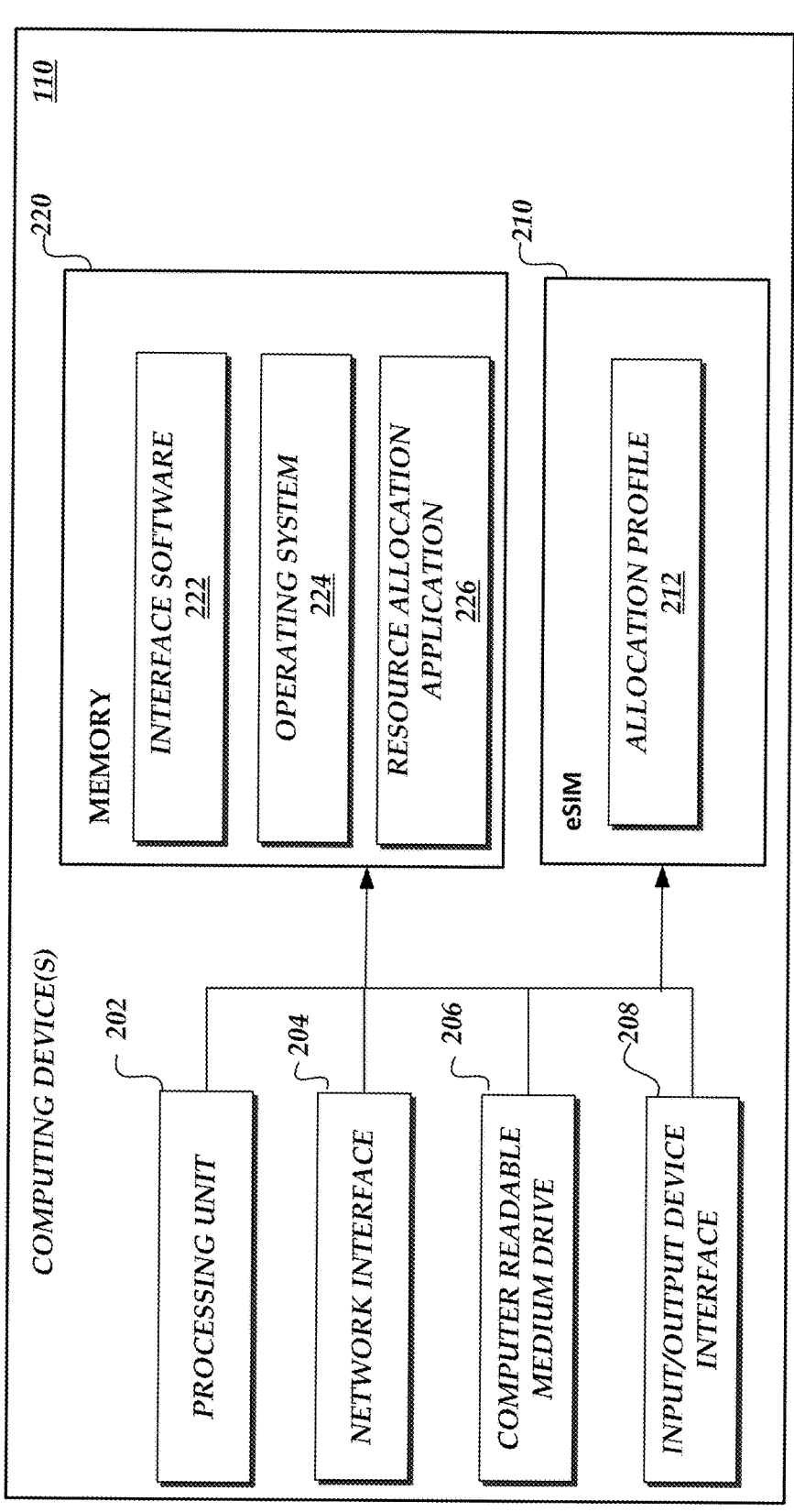
FIG. 2A depicts a block diagram of an example architecture of a computing device including an embedded subscriber identity module (eSIM) module utilized in accordance with illustrative examples.

FIG. 2A depicts a block diagram of an example architecture of the computing device(s) 110*a* utilized for requesting a reservation of a physical computing resource(s) 120*a-b* of FIG. 1A and FIG. 1B. The general architecture of the computing device(s) 110*a-b* is depicted in FIG. 2A includes an arrangement of hardware and software components that may be used to implement aspects of the computing device(s) 110*a-b* of FIGS. 1A and 1B. As illustrated the computing device(s) 110*a-b* includes a processing unit 202, a network interface 204, computer readable medium drive 206, input/output device interface 208, memory 220, and an eSIM 210. The processing unit may receive instructions to request a reservation of a physical computing resource(s) 120*a-b* of FIGS. 1A and 1B.

The input/output device interface 208, may include a wireless transceiver for establishing a connection with a reservation server 130 of FIG. 1B, further the input/output device interface 208 may include wired connections to the physical computing resource(s) 120*a-b* of FIGS. 1A and 1B. The memory 220 includes interface software 222, an operating system 224, and a resource allocation application 226.

The network interface 204 can provide connectivity of the computing device(s) 110*a-b* to the network 140 of FIGS. 1A and 1B or connectivity to the wireless network 150 for FIG. 1A. The processing unit 202 can receive information and instructions from other computing systems or services via a network. The processing unit 202 can also communicate to and from memory 220 and the eSIM 210 where the eSIM 210 hosts an allocation profile 212 that would be received from the reservation server 130 of FIGS. 1A and 1B.

Memory 220 can correspond non-transitory computer-readable medium that includes computer program instructions that the processing unit 202 executes in order to implement one or more examples of the computing device(s)

110*a-b*. The memory 220 generally includes RAM, ROM, or other persistent or non-transitory memory. The memory 220 can store an operating system 224 that provides computer program instructions for use by the processing unit 202. The memory 220 can further include computer program instructions and other information for implementing aspects of the computing device(s) 110*a-b*. For example, the memory 220 includes Interface software 222 for communicating with the reservation server 130 of FIGS. 1A and 1B.

The memory 220 can further include a resource allocation application 226 for managing requests for accessing a physical computing resource(s) 120*a-b* of FIGS. 1A and 1B. The resource allocation application 226 may submit the request to obtain access to the physical computing resource(s) 120*a-b* of FIGS. 1A and 1B for a specified duration of time, where the request includes allocation information or profile information as previously described. The allocation information may include, in additional to traditional information stored for eSIM functionality, device information such as device serial number, employee info such as employee ID, dock info such as dock serial number, and credentials such as credential code. The resource allocation application 226 may store the allocation information as a single profile (expanded) or in a plurality of profiles including profiles for wireless access and profiles for resource allocation. Included in the resource allocation application 226, or as separately implemented in a different application, is LPA functionality for accessing, modifying, and updating profile information stored in the secured storage location (e.g., the eSIM). The computing device(s) 110*a-b* receives from the reservation server 130 of FIGS. 1A and 1B allocation profile 212 that is stores in the eSIM 210 of the computing device(s) 110*a-b*. The allocation profile 212 hosts the device profile information along with the authentication credential information for accessing the physical computing resource(s) 120*a-b* of FIGS. 1A and 1B.

Figure 2B:
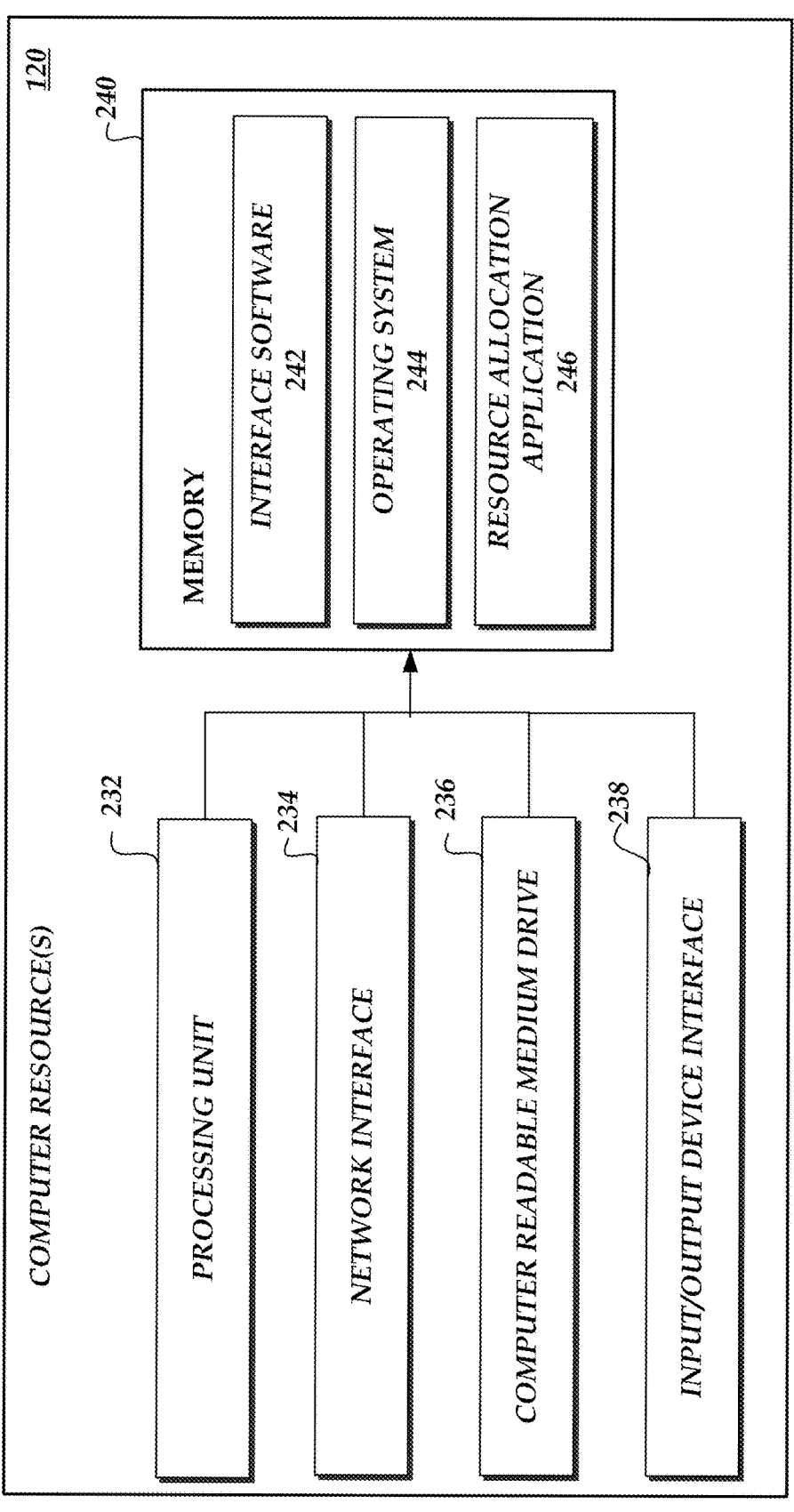
FIG. 2B depicts a block diagram of an example architecture of a physical computing resource for interacting with a reservation service in accordance with illustrative examples.

FIG. 2B depicts a block diagram of an example architecture of the physical computing resource(s) 120*a-b* utilized for a computing device(s) 110*a-b* of FIGS. 1A and 1B to request a reservation for and utilize various available functions. The general architecture of the physical computing resource(s) 120*a-b* is depicted in FIG. 2B includes an arrangement of hardware and software components that may be used to implement aspects of the physical computing resource(s) 120*a-b* of FIGS. 1A and 1B. As illustrated the physical computing resource(s) 120*a-b* includes a processing unit 232, a network interface 234, computer readable medium drive 236, input/output device interface 238, and a memory 240. The processing unit may receive instructions to provide device profile information to a reservation server 130 of FIGS. 1A and 1B when a computing device(s) 110*a-b* of FIGS. 1A and 1B requests a reservation of the physical computing resource(s) 120*a-b*.

The input/output device interface 238, may include a wireless transceiver for establishing a connection with a reservation server 130 of FIG. 1B, further the input/output device interface 238 may include wired connections to the computing device(s) 110*a-b* of FIGS. 1A and 1B. The memory 240 includes interface software 242, an operating system 244, and a resource allocation application 246.

The network interface 234 can provide connectivity of the physical computing resource(s) 120*a-b* to the network 140 of FIGS. 1A and 1B. The processing unit 202 can receive information and instructions from other computing systems or services via a network. The processing unit 232 can also communicate to and from memory 240.

Memory 240 can correspond non-transitory computer-readable medium that includes computer program instructions that the processing unit 232 executes in order to implement one or more examples of the physical computing resource(s) 120a-b. The memory 240 generally includes RAM, ROM, or other persistent or non-transitory memory. The memory 240 can store an operating system 244 that provides computer program instructions for use by the processing unit 232. The memory 240 can further include computer program instructions and other information for implementing aspects of the physical computing resource(s) 120a-b. For example, the memory 240 includes interface software 242 for communicating with the reservation server 130 of FIGS. 1A and 1B and/or communicating with the computing device(s) 110a-b of FIGS. 1A and 1B when a connection is established.

The memory 240 can further include a resource allocation application 246 that corresponds to the functionality associated with the computing resources described herein. Specifically, in one example, the resource allocation application 246 receives a request from the reservation server 130 for FIGS. 1A and 1B to provide device identifier information of the physical computing resource(s) 120a-b that is selected by the user to reserve. The physical computing resource(s) 120a-b receives from the reservation server 130 of FIGS. 1A and 1B allocation profile information that includes information regarding profile information of the computing device(s) 110a-b that submits the request to reserve, also sometimes referred to as resource allocation information, and authentication credential information. The user, upon approaching the reserved time window for a specified physical computing resource(s) 120a-b, may attempt to establish a connection with the physical computing resource(s) 120a-b using the computing device(s) 110a-b utilized for submitting the request. The physical computing resource(s) 120a-b obtains the resource allocation information from the computing device(s) 110a-b and verifies information matches the resource allocation information provided by the reservation server 130 from FIGS. 1A and 1B along with the credential information. Based on the verification the physical computing resource(s) 120a-b provides access to the operable function (e.g., I/O ports) and attributes that are available for utilization on the physical computing resource(s) 120a-b.

Figure 2C:
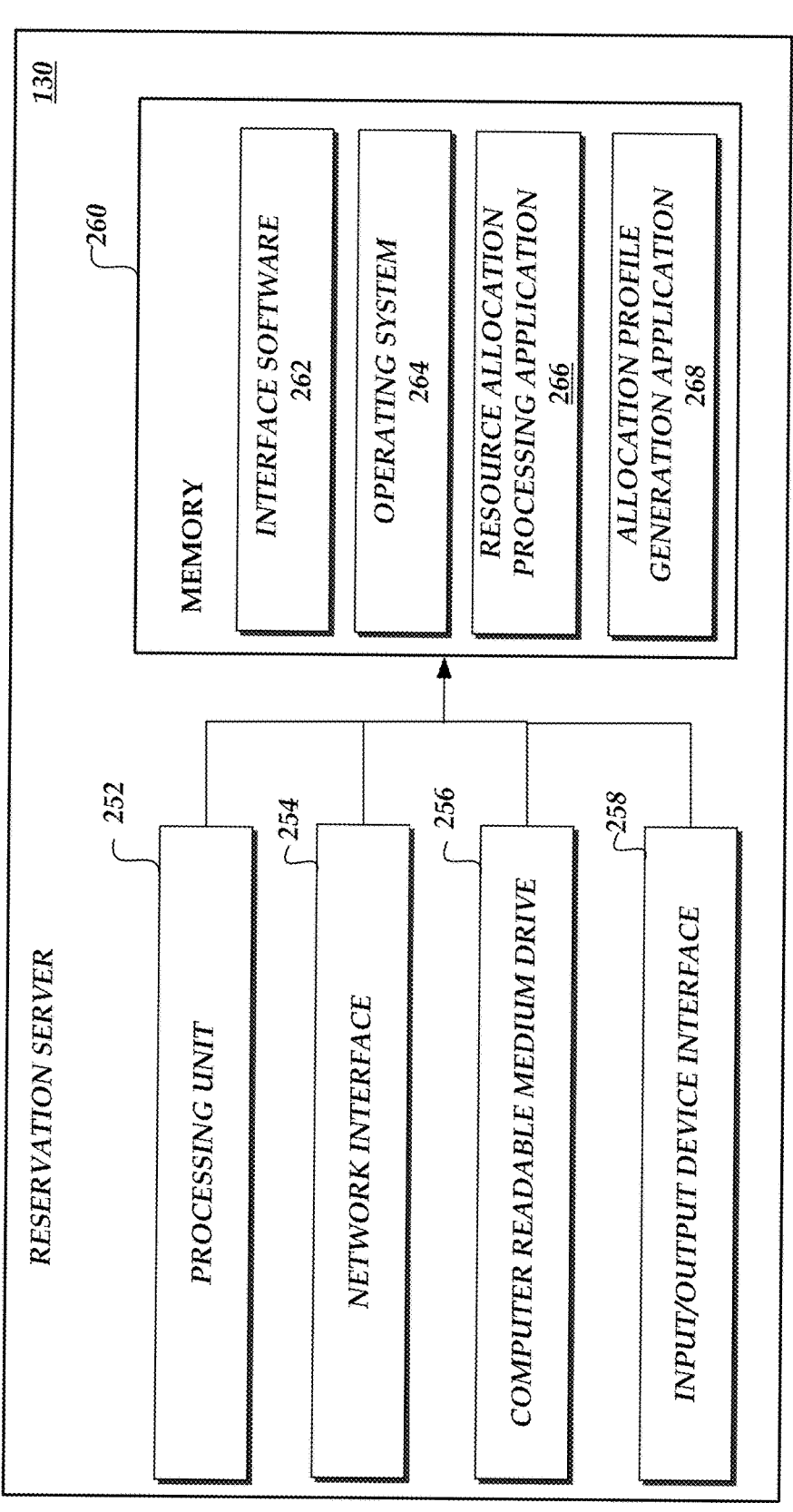
FIG. 2C depicts a block diagram of an example architecture of a server for implementing a reservation service in accordance with illustrative examples.

FIG. 2C depicts a block diagram of an example architecture of the reservation server 130 implementing an allocation service and utilized for physical computing resource(s) 120a-b of FIGS. 1A and 1B reservation, wherein the request for to reserve the physical computing resource(s) 120a-b of FIGS. 1A and 1B is transmitted by a computing device(s) 110a-b of FIGS. 1A and 1B. The general architecture of the reservation server 130 is depicted in FIG. 2C includes an arrangement of hardware and software components that may be used to implement aspects of the reservation server 130 of FIGS. 1A and 1B. As illustrated the reservation server 130 includes a processing unit 252, a network interface 254, computer readable medium drive 256, input/output device interface 258, and a memory 260. The processing unit may receive instructions to generate and transmit allocation information to a physical computing resource(s) 120a-b and computing device(s) 110a-b of FIGS. 1A and 1B based on the request to reserve a physical computing resource(s) 120a-b of FIGS. 1A and 1B.

The input/output device interface 258, may include a wireless transceiver for establishing a connection with a computing device(s) 110a-b and/or physical computing resource(s) 120a-b of FIGS. 1A and 1B. The memory 260 includes interface software 262, an operating system 264, a resource allocation processing application 266, and an allocation profile generation application 268.

The network interface 254 can provide connectivity of the reservation server 130 to the network 140 of FIGS. 1A and 1B. The processing unit 252 can receive information and instructions from other computing systems or services via a network. The processing unit 252 can also communicate to and from memory 260.

Memory 260 can correspond non-transitory computer-readable medium that includes computer program instructions that the processing unit 202 executes in order to implement one or more examples of the reservation server 130. The memory 260 generally includes RAM, ROM, or other persistent or non-transitory memory. The memory 260 can store an operating system 264 that provides computer program instructions for use by the processing unit 252. The memory 260 can further include computer program instructions and other information for implementing aspects of the reservation server 130. For example, the memory 260 includes interface software 262 for communicating with the computing device(s) 110a-b and physical computing resource(s) 120a-b of FIGS. 1A and 1B.

The memory 260 further includes a resource allocation processing application 266 that corresponds to the functionality associated with the allocation service described herein. Specifically, in one example, the resource allocation application 24. Obtains the request to reserve a physical computing resource(s) 120a-b of FIG. 1A an 1B from the computing device(s) 110a-b of FIGS. 1A and 1B, wherein the request contains device profile information of the computing device(s) 110a-b of FIGS. 1A and 1B. The reservation server 130 request profile information to be transmitted from the computing resource(s) 120a-b of FIGS. 1A and 1B that was elected to be reserved by a user. The allocation profile generation application 268 generates allocation information in response to the request including information such as credentials for authentication and resource allocation information as previously described. The reservation server 130 transmits the generated allocation information to the computing device(s) 110a-b and physical computing resource(s) 120a-b of FIGS. 1A and 1B for authentication of device connection.

Figure 3:
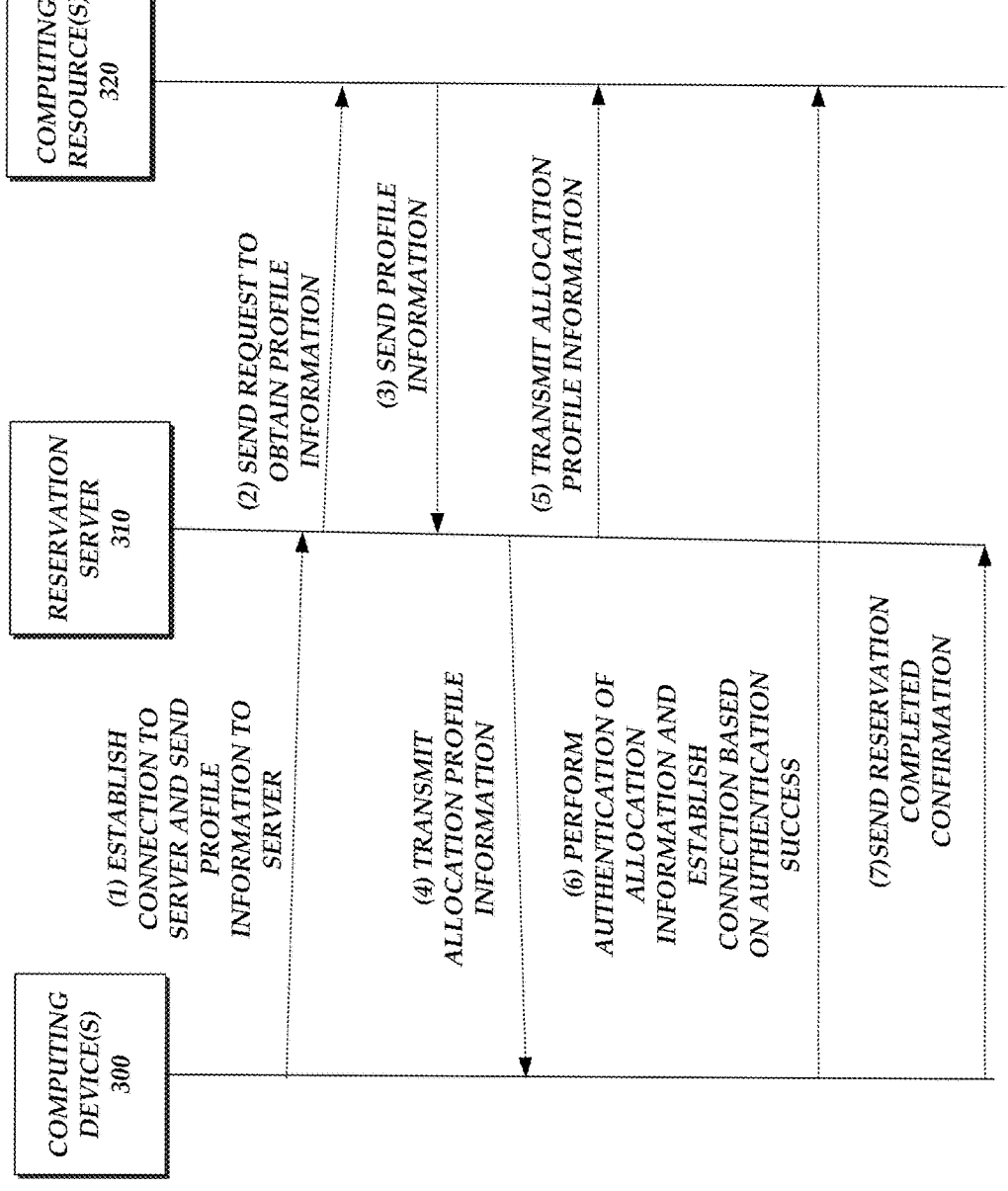
FIG. 3 is a diagram of illustrative interactions between a computing device, a reservation service, and a physical computing resource to attempt to reserve access to the physical computing resource.

FIG. 3 is a diagram illustrating interactions between the computing device(s) 300, reservation server 310, and physical computing resource(s) 320 to implement reservation of a physical computing resource(s) 320 wherein the request to reserve was transmitted from the computing device(s) 300. For purpose of illustration, computing device(s) 300 represent an illustrative computing device(s) 110a-b of FIGS. 1A and 1B, the reservation server 310 represent an illustrative reservation server 130 of FIGS. 1A and 1B, and the physical computing resource(s) 320 represent an illustrative computing resource(s) 120a-b of FIGS. 1A and 1B. The diagram illustrates the routine between computing device(s) 300, reservation server 310, and physical computing resource(s) 320 wherein the computing device(s) 300 establishes a connection with the server and sends profile information to the server (1) based on requesting to reserve a physical computing resource(s) 320 for a specified time window. The request may further include pre-defined preferences for the computing resource(s) selection within the local area. The profile information may include specified identity related to the user of the computing device(s) 300 and the computing device(s) 300 such as embedded identity document (EID), device serial number (SN) and employee identification (ID). The reservation server 310 obtains the request and determines, of the plurality of physical computing resource(s) within the local area, the correct computing resource(s) 320 that was requested to reserve. The reservation server 310 sends a request to obtain profile information (2) from the physical computing resource(s) 320. The profile information of the physical computing resource(s) 320 may include dock information such as information regarding a unique identifier of the physical computing resource(s) 320 (e.g., a dock serial number).

Upon receiving a request from the reservation server 310, the physical computing resource(s) 320 transmits the profile information (3) to the reservation server 310, wherein it processes the profile information from the physical computing resource(s) 320 and the profile information of the computing device(s) 300. The reservation server 310 generates an allocation information that includes custom eSIM profile and credentials for authentication caused by the reservation request and transmits the allocation profile information (4) to the computing device(s) 300 via a local profile assistant (LPA) and further transmits the allocation profile information (5) to the physical computing resource(s) 320. The reservation server 310 further instructs the computing device(s) 300 and physical computing resource(s) 320 to download the allocation information, where the computing device(s) 300 stores the allocation information within the eSIM 210 of FIG. 2A and the physical computing resource(s) 320 stores the allocation information in memory 220 of FIG. 2B. The eSIM may be set to a test class type after receiving the allocation information to conceal the information from user visibility and tampering.

The computing device(s) 300 is ready to use the reserved physical computing resource(s) 320, as the time allocated for utilizing the physical computing resource(s) 320 nears, the user of the computing device(s) 300 may attempt to make a connection with the reserved physical computing resource(s) 320, sometimes referred to as triggering event, wherein the computing device(s) 300 transmits the allocation information to the physical computing resource(s) 320 where it is compared with the allocation information obtained by the reservation server 310. The physical computing resource(s) 320 performs an authentication of the allocation information and establishes a connection based on authentication success (6). The authentication success authorizes the computing device(s) 300 access to the various functionalities provided by the physical computing resource(s) 320. Example of the functionalities may be utilization of external devices, I/O ports, device charging, etc. The computing device(s) 300 sends a verification to the reservation server 310 that the computing device(s) 300 successfully connected with the physical computing resource(s) 320 and sends a reservation completed confirmation (7) to the reservation server 310.

The physical computing resource(s) 320 will deny access to other computing device(s) 300 that do not match with the allocation information provided from the reservation server 310. When an unauthorized computing device(s) 300 makes a connection with a physical computing resource(s) 320 it did not have a prior reservation for, the computing device(s) may not operate appropriately to gain authorization for utilization. An example not operating appropriately may be the computing device(s) 300 not transmitting a resource allocation to the physical computing resource(s) 320 as it would not have obtained a resource allocation from the reservation server 310 if a reservation was not made. Further, a user may have made a reservation for another physical computing resource(s) 320 and obtains a resource allocation from the reservation server 310, however, the user may have connected to the wrong physical computing resource(s) 320 where based on connecting the computing device(s) 300 to the wrong physical computing resource(s) 320 the resource allocation does not match the resource allocation the wrong physical computing resource(s) 320 would have received from the reservation server 310. Based on unmatching resource allocations, the physical computing resource(s) does not unlock any functional feature of the device and remains in a configured lock state.

Figure 4:
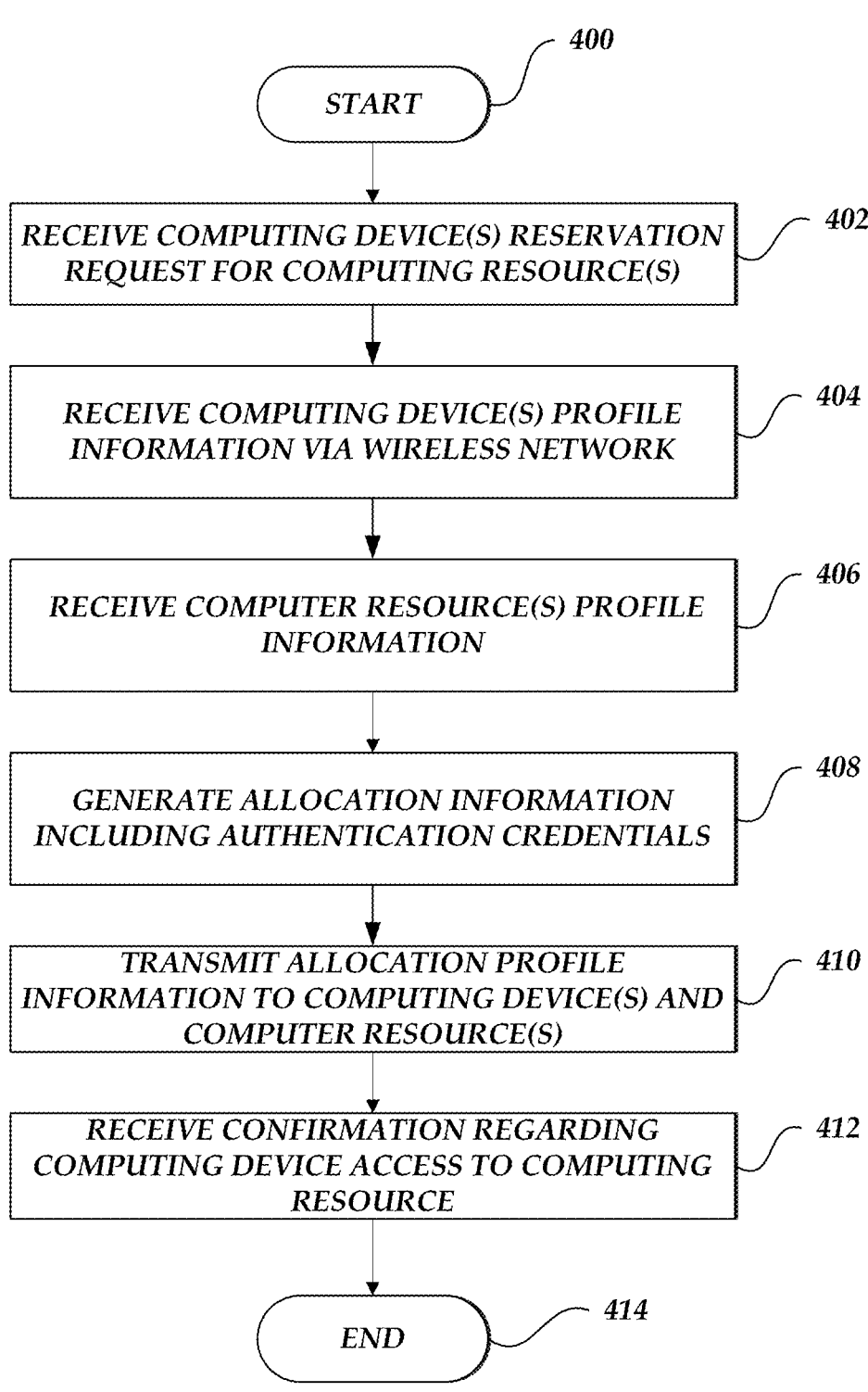
FIG. 4 is a flow diagram of a routine implemented by a reservation service for receiving and processing requests to reserve a physical computing resource in accordance with illustrative examples.

FIG. 4 is a flow diagram of a routine implemented by reservation server 130 of FIGS. 1A and 1B obtaining a request to reserve a physical computing resource(s) 120a-b of FIGS. 1A and 1B from a computing device(s) 110a-b of FIGS. 1A and 1B. The user is able to use the computing device(s) to request a reservation of a physical computing resource(s) from a reservation server that may host an interface for reservation allocation. The interface may include reservation allocation requirements such as location, time frame, and a reserving device, etc. The user can select a reservation request from a plurality of physical computing resource(s) available within the network. In some embodiments, the user may have the option to reserve a physical computing resource that is located outside of the network. At block 402, the reservation server receives a computing devices reservation request for a computing resource wherein the request includes a specified duration of time of a specified physical computing resource. The user may further have the ability to modify reservation request, wherein the reservation may be updated to a different physical computing resource(s) and/or a different time window.

At block 404, the reservation server receives a computing device(s) profile information via a wireless network. The profile information that is transmitted from the computing device, stored on an eSIM, are information regarding device information such as device serial number, employee information such as employee ID, dock information such as dock serial number, and credentials such as credential code. Based on obtaining a reservation request from a computing device(s) and the computing device(s) profile information, the reservation server transmits a request to the physical computing resource(s) for the physical computing resource(s) profile information.

At block 406, the reservation server receives physical computing resource profile information from a physical computing resource. The reservation server utilizes the profile information from both computing device and the physical computing resource to generate a unique profile of the reservation request that is used for authentication. The profile information from both devices is not modifiable by the user operating the device and are typically stored within a private storage system of the device. At block 408, the reservation server generates allocation information that further including authentication credentials. The computing device(s) uses the allocation information and authentication credential as a verification system with the physical computing resource(s) for verifying the accuracy of the elected device in an attempt to connect.

At block 410 the reservation server, transmits allocation information to the computing device and physical computing resource. The computing device stores the allocation information within the private storage. The computing device further used the allocation information for the authentication of the physical computing resource(s) when a connection is established. The connection between the physical computing resource and computing device, a triggering event, may be a physical connection that may be an analog or digital connection, wherein a determination that an electrical connection is established. The physical computing resource(s), upon establishing a connection with a computer device(s), may retrieve the allocation information from the reservation server for verification of the computing device.

At block 412 the reservation server receives confirmation regarding computing device(s) access to the physical computing resource(s). The computing device(s), upon establishing a connection between the physical computing resource(s) may determine to send information regarding the status of accessing a physical computing resource(s). The computing device(s) may transmit to the reservation server, connection was successful, based on the physical computing resource(s) authorizing access to the operable functions and attributes of the device. In another embodiment, the reservation server may receive, from a computing device(s), information regarding failure to access a physical computing resource(s). Failure to access a physical computing resource(s) may include information regarding the computing device(s) not establishing a connection with a physical computing resource(s) or information regarding failure to authenticate credentials.

Figure 5:
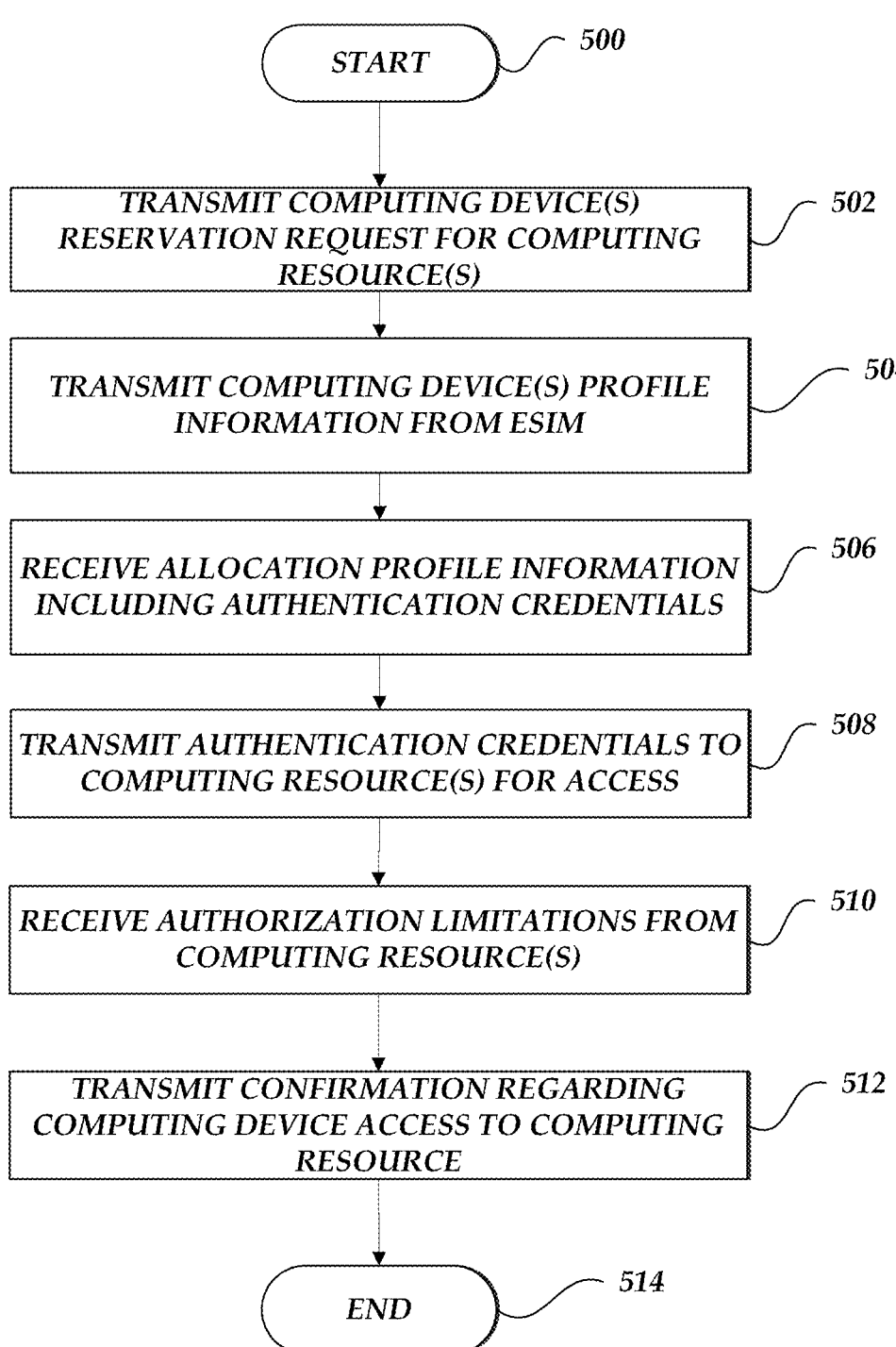
FIG. 5 is a flow diagram a routine implemented by a computing device for transmitting and gaining access to a reserved physical computing resource in accordance with illustrative examples.

FIG. 5 is a flow diagram implemented by a computing device(s) requesting reservation of physical computing resource. The user operating a computing device can submit a request via wireless communication to a reservation server, requesting a reservation of a physical computing resource(s). The computing device(s) can be a mobile electronic device that comprises a transceiver for wireless communication. Further, the computing device(s) can be assigned to a user by an administrator, where the device profile information is configured to a specified user of a specified device. At block 502, the computing device(s) transmits a reservation request for the physical computing resource(s). The reservation request may comprise information regarding time allocation and specific physical computing resource(s) requesting a reservation for. The user of the computing device(s) submitting the request may interact with a reservation server interface, wherein the reservation server interface hosts the selection of physical computing resource(s) available and the time allocations. The reservation request is submitted to a reservation server 130 of FIGS. 1A and 1B, wherein the reservation server process the reservation request.

At block 504, the computing device(s) after transmitting the reservation request, further transmits profile information stored on the eSIM of the computing device(s). The profile information may include information regarding the unique device identification information and unique user identification information. The profile information is transmitted to the reservation server, wherein the reservation server processes the profile information of the computing device(s) and physical computing(s) resource into allocation profile information and authentication credentials.

At block 506, the computing device(s) receives allocation profile information including authentication credentials. The allocation information is transmitted by the reservation server after processing the reservation request submitted by the computing device(s). The allocation information is generated by the reservation server based on reservation information as well as the profile information of the computing device(s) and physical computing resource(s). The allocation information hosts authentication credentials that are used for comparison with the physical computing resource(s) elected for reservation. The authentication credentials may be any type of encrypted identifier that is unique to the device transmitting a request to reserve a specified physical computing resource(s). Received via the LPA, the custom eSIM profile, wherein the computing device(s) stores the updated profile as a test class type to prevent user visibility and tampering.

A user, after completing the reservation of a physical computing resource(s), can attempt to establish a connection with the physical computing resource(s) using the computing device(s) the reservation request was submitted from. The user may make a physical connection (e.g., wired communication) to the physical computing resource(s). At block 508, the computing device(s) transmits authentication credentials to the computing resource(s) for access. Based on the authentication process of the physical computing resource(s) the computing device(s) will gain access to operable functions and attributes of the physical computing resource(s).

At block 510, computing device receives authorization limitations from computing resource. In another embodiment, the authentication credentials may limit the operable functions and attributes of the physical computing resource(s) based on the authentication provided by the physical computing resource(s). In another embodiment, the authentication credentials may be rejected by the physical computing resource(s), wherein the computing device(s) will not have access to use the operable functions and attributes of the physical computing resource(s).

At block 512, the computing device(s) transmits confirmation regarding the computing device(s) access to the physical computing resource(s). The computing device(s), establishing a connection between the physical computing resource(s), may determine to send information regarding the status of accessing a physical computing resource(s) based on the authorization limitations received. The computing device(s) may transmit confirmation regarding computing device(s) access to the physical computing resource(s) to the reservation server based on accessing the operable functions and attributes of the device.

In another embodiment, the reservation server may receive, from a computing device(s), information regarding failure to access a physical computing resource(s). Failure to access a physical computing resource(s) may include information regarding the computing device(s) not establishing a connection with a physical computing resource or information regarding failure to authenticate credentials.

Figure 6:
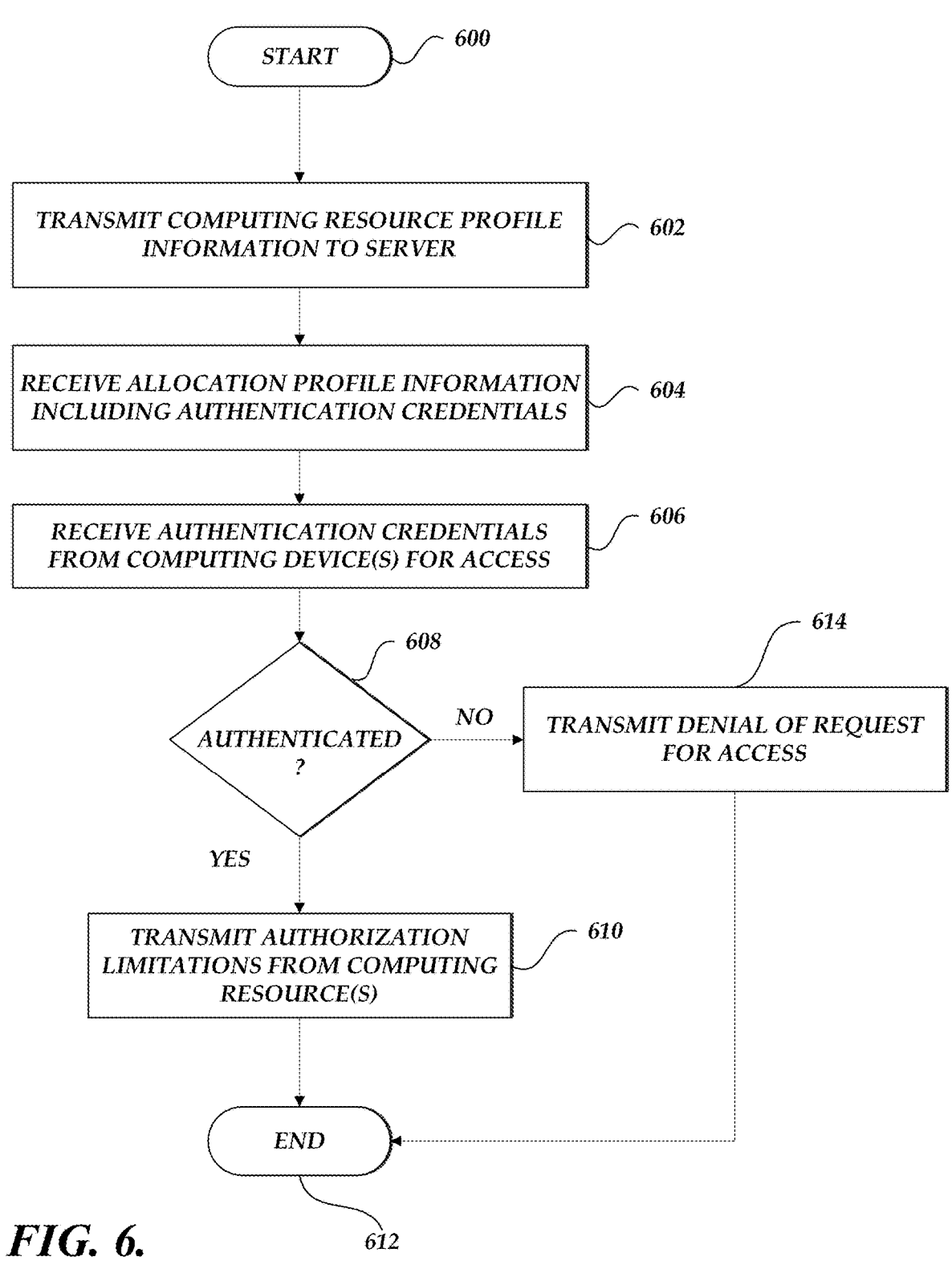
FIG. 6 is a flow diagram of a routine implemented by a physical computing resource for authenticating a computing device for access to the physical computing resource in accordance with illustrative examples.

FIG. 6 is a flow diagram implemented by physical computing resource(s) receiving a reservation request from a reservation server, wherein the reservation request was originally transmitted from a computing device(s). The physical computing resource(s) receives a request from a reservation server to transmit profile information of the physical computing resource(s) based on the reservation server receiving a request from a computing device(s) that a reservation is being requested. At block 602, the physical computing resource(s) transmits profile information to the reservation server, based on the request to reserve. The reservation server processes the profile information obtained from the physical computing resource(s) along with the profile information transmitted from the computing device(s) when the reservation request was submitted and generates allocation information and authentication credentials.

At block 604, the physical computing resource(s) receives allocation profile information including authentication credentials. The physical computing resource(s) stores the allocation profile information and authentication credentials in memory until the computing device(s) attempts to establish a connection. The user may attempt connecting the computing device(s) to the physical computing resource(s)

when the time allocated for reservation has neared. The user may use a physical connection to connect the computing device(s) to the physical computing resource(s). The physical connection may be referred to as a triggering event, wherein the connection of computing device(s) and physical computing resource(s) make an electrical connection. The electrical connection may be an analog communication connection or a digital communication connection. The triggering event may further correspond to determination that the computing device(s) and the physical computing resource(s) have a common network.

Based on establishing a connection to the physical computing resource(s) the computing device transmits allocation information to the physical computing resource(s). At block 606, the physical computing resource(s) receives authentication credentials from computing device for access. The physical computing resource(s) process the authentication credentials and compares it with the allocation information received from the reservation server, and based on a successful match of the authentication credentials the physical computing resource grants access to the computing device(s).

In an embodiment where the user attempts to establish a connection to the physical computing resource(s) outside of the allocated time frame, the computing device may not transmit authentication credentials to the physical computing resource(s).

At block 608, the computing resource(s) may determine if the computing device(s) is authenticated based on the successful match of the authentication credentials, the authentication provides a required authorization to the reserving computing device(s) for access to the physical computing resource(s). The authentication may be a communication with the computing device(s) providing instructions to utilize the operable functions and attributes of the physical computing resource(s).

At block 610, the physical computing resource transmits authorization limitations from computing resource. The physical computing resource may allow utilization of specific operating functions of the physical computing resource based on the authentication credentials. In an embodiment where the authentication credentials are not a successful match, the physical computing resource(s) restricts all operable functions and attributes until a computing device(s) with matching authentication credentials establishes a connection.

Referring to block 608, the computing resource(s) may determine that the computing device(s) is not authenticated based on failing to match authentication credentials. Failure to authenticate may result in the failure to match authentication credentials of the computing device(s) and the authentication credentials of the physical computing resource(s). Failure to authenticate may result in the computing device(s) lack of receiving authentication credentials from the reservation server.

At block 614, the physical computing resource(s) transmits a denial of request for access based on the failure to authenticate. The computing device(s) may attempt to request a reservation for a physical computing resource(s) that is available within the desired time slot to obtain proper authentication credentials and for a successful authentication and utilization of a physical computing resource(s).

Figure 7A:
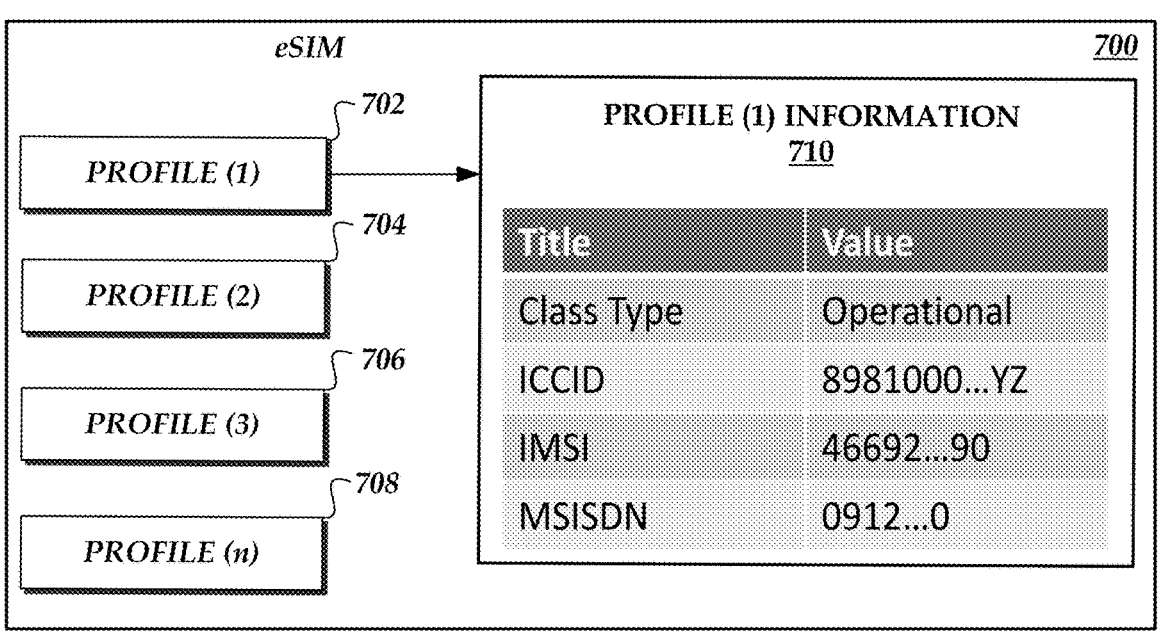
FIG. 7A-7B is an illustrative example of the eSIM profiles of the computing device.
Figure 7B:
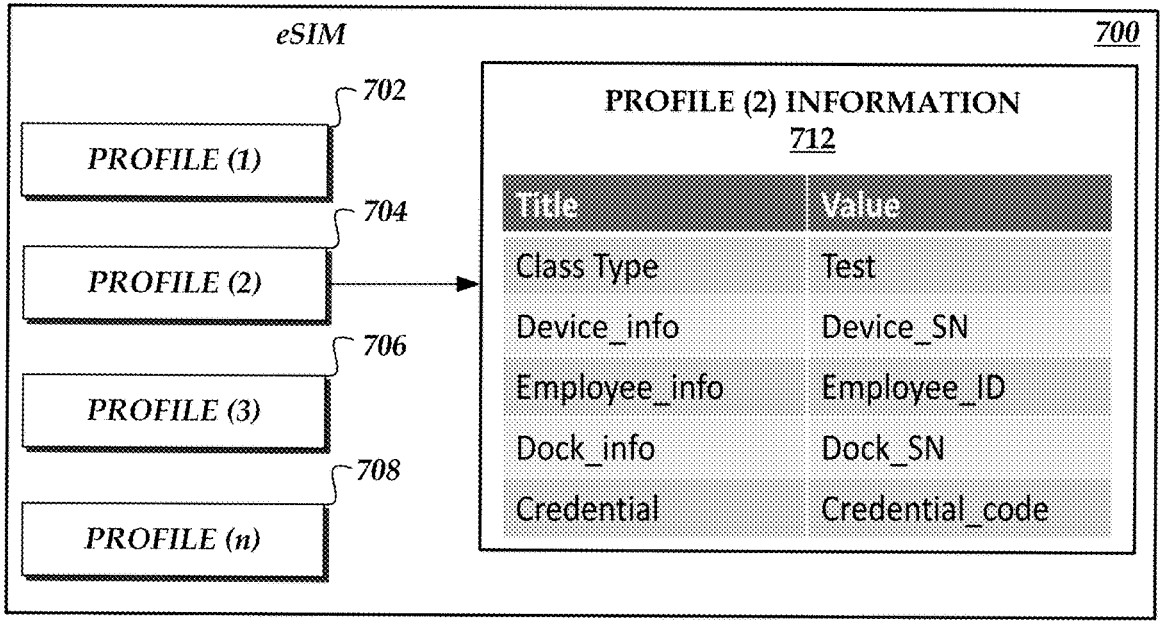

FIG. 7A-7B is an illustrative example an eSIM 700 storing at least one profile stored within the computing device(s) 110a-b of FIGS. 1A and 1B. The eSIM 700 is configured to store various profiles as represented with respect to profile (1) 702, profile (2) 704, profile (3) 706, and profile (n) 708. The various profiles stored on the eSIM 700 may provide profile (1) information 710 for wireless communication connectivity of the computing device(s) 110a-b of FIGS. 1A and 1B. Furthermore, the various profiles stored on the eSIM 700 may provide profile (2) information 712 for submitting a request to reserve a computing resource(s) 120a-b of FIGS. 1A and 1B.

As represented in FIG. 7A profile (1) 702 of the eSIM 700 may store the profile (1) information 710 that the computing device(s) 110a-b of FIGS. 1A and 1B was initially configured to store, as it may allow the computing device(s) 110a-b of FIGS. 1A and 1B access to a wireless communication network authenticated to use. As represented in FIG. 7B profile (2) 704 of the eSIM 700 may store the profile (2) information 712, as configured by an administrator, device information and user information directly related to a specified computing device(s) 110a-b of FIGS. 1A and 1B. The computing device(s) 110a-b of FIGS. 1A and 1B, in an attempt to submit a request to reserve a computing resource(s) 120a-b of FIGS. 1A and 1B, may transmit profile (2) information 712 to a reservation server 130 of FIGS. 1A and 1B wherein the reservation server processes the profile (2) information 712 with the computing resource(s) 120a-b of FIGS. 1A and 1B profile information generating allocation profile information.

The reservation server transmits the allocation profile information to the computing device(s) 110a-b of FIGS. 1A and 1B wherein the device may store the allocation profile information in another profile of the eSIM 700, such as profile (3) 706 or profile (n) 708. Furthermore, the computing device(s) 110a-b of FIGS. 1A and 1B may be instructed to update the profile (2) information 712 to store the allocation profile information, wherein the allocation profile information includes the profile information transmitted during the request to reserve, as well as information authentication credentials. Based on the profiles stored on the eSIM 700, the computing device(s) 110a-b of FIGS. 1A and 1B will determine to transmit the profile configured to store the allocation profile information to the computing resource(s) 120a-b of FIGS. 1A and 1B when an attempt to establish a connection is made.

Conditional language such as, among others, "can," "could," "might," or "may," unless specifically stated otherwise, are otherwise understood within the context as used in general to convey that certain examples include, while other examples do not include, certain features, elements, and/or blocks. Thus, such conditional language is not generally intended to imply that features, elements, and/or blocks are in any way required for any examples or that any example necessarily includes logic for deciding, with or without user input or prompting, whether these features, elements, and/or blocks are included or are to be performed in any particular example.

Disjunctive languages such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include computer-executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A non-transitory computer readable medium comprising computer-executable instructions that, when executed by a processor of an electronic device, cause the electronic device to:

transmit, to a resource allocation service, a request for access to a computing resource for a defined time period, wherein the request includes device identifier information associated with the electronic device, wherein the device identifier information is stored as an embedded subscriber identification module (eSIM) profile in the electronic device;

receive, from the resource allocation service, allocation information, wherein the resource allocation information includes computing device resource identification information of a particular computing resource selected in response to the transmitted request and wherein the allocation information includes authentication credential information generated by the resource allocation service;

store the received allocation information in a storage location on the electronic device, wherein the allocation information is not accessible by a user of the electronic device; and in response to detecting a triggering event, transmit the resource allocation information to a computing resource for authentication of the electronic device, wherein access to the computing resource during the defined time period is based on a successful authentication of the electronic device using the authentication credential information.

2. The non-transitory computer readable medium of claim 1, wherein the computer-executable instructions when executed, further cause the processor to receive user input selecting the computing resource.

3. The non-transitory computer readable medium of claim 1, wherein the computer-executable instructions when executed, further cause the processor to include a selection of the computing resource in the request for access to the computing resource.

4. The non-transitory computer readable medium of claim 1, wherein the resource allocation information includes authorization configuration information for configuring at least one access attribute to the computing resource.

5. The non-transitory computer readable medium of claim 1, wherein the computer-executable instructions when executed, further cause the processor to the received allocation information in accordance with an eSIM configuration such that the stored allocation information is not accessible by a user of the electronic device.

6. The non-transitory computer readable medium of claim 1, wherein the triggering event corresponds to detection of an electric connection with the computing resource.

7. The non-transitory computer readable medium of claim 1, wherein the triggering event corresponds to detection of a common network connection with the computing resource.

* * * * *